United States Patent
Priestley

[15] 3,704,869
[45] Dec. 5, 1972

[54] GAS/LIQUID FILM CONTACT APPARATUS

[72] Inventor: Ronald Priestley, 84 Chesterwood Road, Kings Heath, Birmingham 14, England

[22] Filed: Aug. 1, 1969

[21] Appl. No.: 846,751

[30] Foreign Application Priority Data

Aug. 6, 1968  Great Britain....................37,479/68

[52] U.S. Cl....................................261/112, 55/241
[51] Int. Cl..............................................B01f 3/04
[58] Field of Search..........................55/241; 261/112

[56] References Cited

UNITED STATES PATENTS

| | | | |
|---|---|---|---|
| 3,415,502 | 12/1968 | Munters | 261/112 |
| 3,235,234 | 2/1966 | Beaudoin | 261/112 X |
| 2,077,427 | 4/1937 | Lissman | 261/112 |
| 3,347,381 | 10/1967 | Minch et al. | 261/112 X |
| 3,281,307 | 10/1966 | Moeller et al. | 261/112 X |

*Primary Examiner*—Tim R. Miles
*Assistant Examiner*—Steven H. Markowitz
*Attorney*—Wolfe, Hubbard, Leydig, Voit & Osann, Ltd.

[57] ABSTRACT

Packing sheets for gas/liquid contacting apparatus consist of a number of spaced parallel units, each of which is a sector of a hollow corrugated tube, connected by planar portions of the sheets. The assembled sheets provide a regular array of hollow corrugated tubes.

12 Claims, 5 Drawing Figures

3,704,869

Inventor:-
Ronald Priestley,
By:- Wolfe, Hubbard, Voit & Osann,
His Attorneys.

PATENTED DEC 5 1972

Inventor:—
Ronald Priestley,
By: Wolfe, Hubbard, Voit & Osann,
His Attorneys.

GAS/LIQUID FILM CONTACT APPARATUS

This invention relates to apparatus for use in effecting contact of a gas with a flowing liquid film. There are numerous industrial processes where this type of contact is desired, examples being those where it is desired to effect a heat transfer between the liquid and the gas, as in cooling towers, those in which a gas is required to pick up vapors of a liquid, those in which a liquid is required to dissolve a propoortion of a gas, and those in which a liquid and a gas are required to react with one another chemically. Other examples are the fractionation of two or more components by distillation, biological oxidation processes such as the manufacture of vinegar, and biological filtration processes used in the treatment of sewage and industrial effluent.

Various types of packing for vessels in which such contact is to be effected are known; the packing may take the form of a stack of sheets of material over which sheets the liquid flows while the gas (which term is to be understood to include vapors and mixtures of gases and vapors) passes between adjacent sheets in the stack. In such cases, there is a tendency for the sheets to bow and flutter, especially if the rate of gas transmission between them is high, and if they are made of a fairly flexible material (e.g. sheet plastics material). Such movement of the sheets if often undesirable, both in terms of the efficiency of the gas/liquid contact obtained and in terms of the mechanical requirements of the system.

According to the present invention there is provided a packing sheet for use in apparatus in which a film of liquid is caused to flow in contact with a gas, the sheet comprising a number of spaced parallel portions each of which is shaped as a sector of a hollow corrugated tube, of which the peaks and valleys of the corrugations occur successively along the length of the tube, the said portions being connected by substantially planar portions of said sheets.

The cross section of the unit in a plane transverse to the direction of the unit is preferably an arc of a circle, oval, ellipse or other closed regular curve, though it may be a portion of a polygon having at least several sides. Particularly preferred constructions are those in which the said cross section is an arc of a circle extending about 60°, 90°, 120°, or (at preferably) 180°, In these cases, a number of packing sheets may be assembled in such a fashion that a set of assembled packing sheets constitutes a regular array of hollow cylindrical columns, the sides of which are corrugated.

The corrugation of the side walls of the tubes may take a wide variety of form. The section of the tube wall, sectioned in a plane including the axis of the tube, may be a simple sine wave or like corrugation, a zig-zag, or any intermediate curve. A particular type of corrugation has a wall section consisting of consecutive curved portions, the junctions between the curved portions including a ridge. The curved portions may be directly adjacent or separated by linking portions, which join the curved portions at an angle (i.e. in three dimensions the corrugation presents a ridge at that point). A particularly preferred wall section is that of consecutively oppositely curved portions, each linked to the next via a short straight linking portion.

According to a particular feature of the invention there is provided a packing sheet for use in apparatus in which a film of liquid is caused to flow in contact with a gas the sheet being divided into a number of strips, each said strip, considered in a direction transverse to that of the strips, being convex or concave, the contour of the surface of the strip, considered in the direction thereof, being made up of a number of curved portions connected either directly or by linking portions such that the surface of the strip at that point constitutes a ridge.

The corrugations may be so arranged that when the sheets are assembled as noted above, the corrugations in adjacent sections of a column (coming from different units in the sheet) may be in phase or out of phase to any desired degree. By arranging the relative phase of adjacent corrugations it is possible to maintain the cross sectional area of the column in plane transverse to the axis thereof, substantially constant.

In use, an array of columns is placed with the columns vertical or substantially so and liquid allowed to fall over the inner and outer faces of the columns while gas passes up between and through them. The corrugations of the tubes constituting the columns serve to ensure efficient gas/liquid contact and thorough mixing of the liquid stream. The pressure drop of the gas flowing through the array may be maintained very low if the cross sectional area of each tube or column and that of the interspaces also, ism maintained substantially constant.

In some cases it is desirable to provide groups of columns, e.g. four or six such columns, the groups being arranged in a desired regular array, e.g. on a square gird.

The margins of the individual packing sheets may be adapted to aid in fixing the sheets in position, for example by having deformations adapted to engage on a suitable framework, and the sheets may also be provided, either at their margins or at the portions intermediate the strips, with deformations to aid in registering the sheets one with another to consolidate a packing unit made up from such sheets.

The sheets may be assembled by self-interlocking tabs and slots, by welding them or adhering them together, by the use of suitable clips or by any other convenient means.

The sheets are preferably made of thin sheet plastics materials, though sheets of metal or other suitable film or sheet material may also be used. The surface of the sheet may advantageously be dimpled in order to aid the distribution of the liquid, The dimension of such dimpling is, of course, small with respect to the size of the curvature of the units in the sheet and the corrugations therein. The dimpling is preferably constituted by a large number of adjacent small depressions on the surface of the sheet. The preferred manufacturing method is vacuum forming a heated sheet of thermoplastics material.

The packing sheets of the present invention provide packings for apparatus of the type noted above which have great stability and resistance to flutter and other undesirable movement, which are light in weight yet strong, and which may be easily and cheaply produced. In addition, by careful choice of the configuration of the surface of the strips it is possible to achieve a packing through which the gas can flow very easily, i.e. with only a small pressure drop.

In the use of the packing sheets of the present invention, as noted above, the sheets are folded to present a packing consisting of an array of columns, linked together in some cases by linking webs, down the surfaces of which liquid can flow. In use, these columns are generally arranged vertically or substantially vertically. The gas may flow cocurrent or countercurrent to the flow of liquid.

The invention is illustrated, by way of example, with reference to the accompanying drawings in which.

Figure 1:
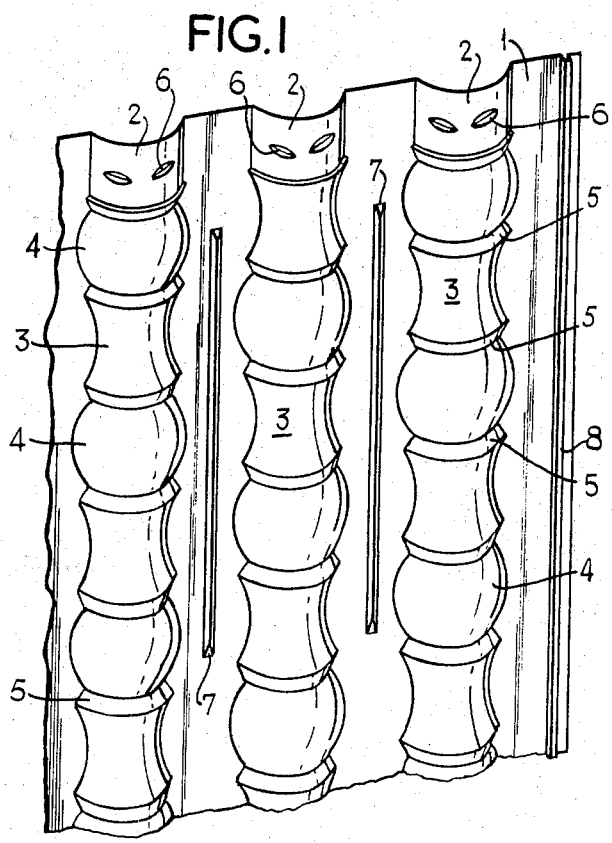
FIG. 1 is a perspective view of part of a packing sheet according to the present invention.

Referring to FIG. 1, a sheet 1 has formed on it four units 2 which each consist of consecutively oppositely curved portions 3 and 4. Portions 3 are generally saddle shaped, while portions 4 are spheroidal. Between each pair of portions 3 and 4 is a linking portion 5 which joins each portion 3 and 4 which a ridge. The surface of portions 3, 4 and 5 is dimpled to help spread water flowing over them.

The end of each unit 2 is provided with a number of short grooves 6 into which wires of a wire frame for supporting the sheet may slot. The substantially planar portions between the units 2 are formed with a rib 7 thereupon to aid in registration of the sheets when they are assembled to form a packing unit. The side margin of the sheet has an impressed groove 8 for a like purpose.

Figure 2:
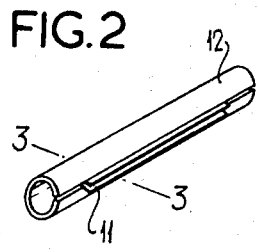
FIG. 2 is a perspective view of a clip for use with such a sheet.
Figure 3:
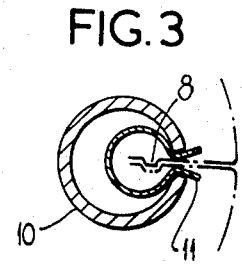
FIG. 3 is a cross section along the lines 3—3 of FIG. 2.

FIGS. 2 and 3 show a simple type of clip for holding the edges of sheets 1 which consists of an elastic plastics tube 12 which elastically biases together the lips of a lining piece 11 held therein. In use, this clip is pushed over two adjacent sheet edges and these are held tightly between the lips of lining piece 11.

Figure 4:
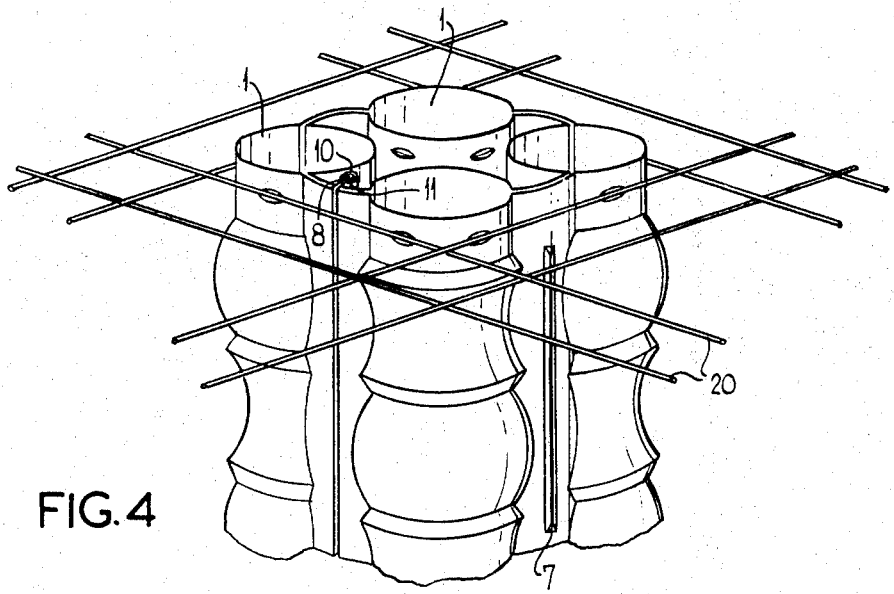
FIG. 4 is a perspective view of two packing sheets, of the type partially shown in FIG. 1, folded to give a group of four colunns, supported on a wire frame.

In FIG. 4, two sheets of the type shown in FIG. 1 have been used to form a square set of four columns. The sheets are held together at their margins by a clip 10. The assembly is held on a wire frame 20, formed of plastics coated steel wires which engage in the grooves 6 on the top edges of sheet 1. Ribs 7 engage with one another to hold the inner sheet in register with the outer, to strengthen the structure, and to prevent the inner sheet slipping in the direction of the columns. Groove 8 engages with the corresponding groove at the opposite edge of the sheet and this also aids in securing a rigid structure.

The inner sheet is preferably so arranged with respect to the outer that a saddle shaped section is always opposite a spheroidal shaped section. This construction gives each of the passages through which the gas flows in use a substantially constant cross section, and this aids the gas flow and lowers the resistance of the packing to such flow of gas. This equality and uniformity coupled with low gas pressure drop across the packing is of particular importance in water cooling applications.

Figure 5:
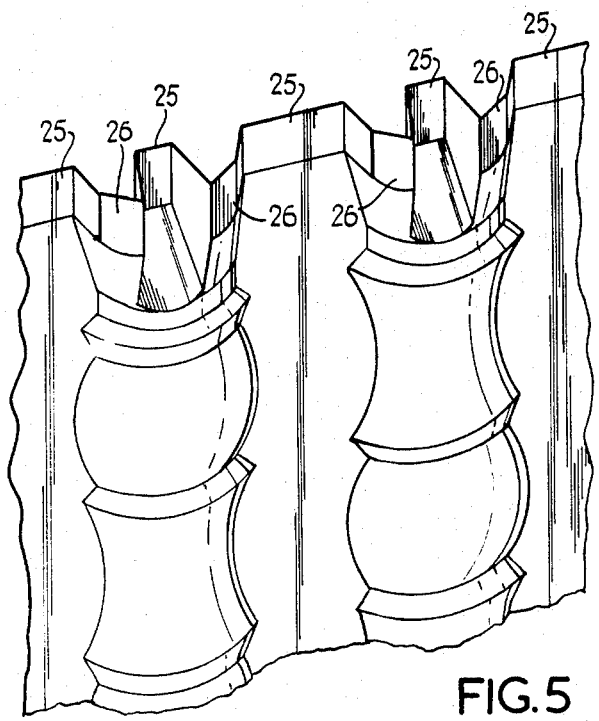
FIG. 5 is a perspective view of an alternative construction of the end of the tube at the margin of the sheet.

In FIG. 5 the margin of the sheet at ends of the tubes is provided with a number of flat portions 25 and 26. Portions 25 may be attached (e.g. by stapling or welding) to portions 25 of the sheet which completes the tubes, while portions 26 serve to aid in assembling groups of four tubes (like FIG. 4) together, without the use of a wire grid or like device. In this way any desired volume may be filled wholly with a self-supporting array of tubes formed from sheets according to this invention.

The present invention thus provides packings and packing sheets which are advantageous for use in gas/liquid contacting apparatus. The packings are of high rigidity and resistance to flutter, on account, it is believed, of the tubular structures formed in the assembled packing, and since the sheets, when assembled to form a packing, are stressed. The sheets are quick and easy to assemble to give a packing, and are easily assembled in an array to fit the size and space available for that array.

It will be observed that the array shown in FIG. 4 is constructed of two identical sheets placed back to back with one turned through 180°. In this way, the corrugations in the inner sheet are out of phase with those in the outer sheet and the cross-sectional area of the tube is substantially constant throughout its length.

The thickness of the sheets used is selected to give the necessary strength. Thinner sheets may, if desired, be used for the inner sheets.

I claim as my invention:

1. A packing sheet for use in apparatus in which a film of liquid is caused to flow in contact with a gas, the sheet comprising a number of spaced parallel portions each of which is shaped as a sector of a hollow corrugated tube, of which the peaks and valleys of the corrugations occur successively along the length of the tube, the said portions being connected by substantially planar portions of said sheets.

2. A packing sheet according to claim 1 wherein the cross section of the unit is an arc of a closed regular curve.

3. A packing sheet according to claim 2 wherein the cross section of the unit is an arc of a circle extending about an angle selected from 60°, 90°, 120° and 180°.

4. A packing sheet according to claim 1 wherein the section to the tube wall, sectioned in a plane including the axis of said tube, consists of consecutive curved portions, the junctions between said curved portions including a ridge.

5. A packing sheet according to claim 4 wherein consecutive curve portions are consecutively oppositely curved and connected together with short straight-line linking portions which join the curved portions at an angle.

6. A packing for use in apparatus in which a film of liquid is caused to flow in contact with a gas, which comprises a plurality of packing sheets according to claim 1 assembled together to form tubes.

7. Apparatus in which a film of liquid is caused to flow in contact with a gas which includes a packing according to claim 6.

8. A packing sheet according to claim 1 which is formed from a sheet of thermoplastics material of substantially even thickness.

9. A packing sheet according to claim 1 wherein deformations are provided on the said sheets to aid in registering a plurality of sheets together to consolidate a packing unit made up from such sheets.

10. Apparatus in which a film of liquid is caused to flow in contact with a gas which includes packing sheets according to claim 1.

11. A packing for use in apparatus in which a film of liquid is caused to flow in contact with a gas, which comprises a plurality of packing sheets, each said sheet being divided into a number of strips, each said strip, considered in a direction transverse to that of the strip, being an arc of a closed regular curve, the contour of the surface of the strip, considered in the direction thereof, being made up of a number of curved portions connected either directly or by linking portions such that the surface of the strip at that point constitutes a ridge, assembled together to form, in section, closed curves.

12. Apparatus in which a film of liquid is caused to flow in contact with a gas which includes a packing according to claim 11.

* * * * *